Figure 1:
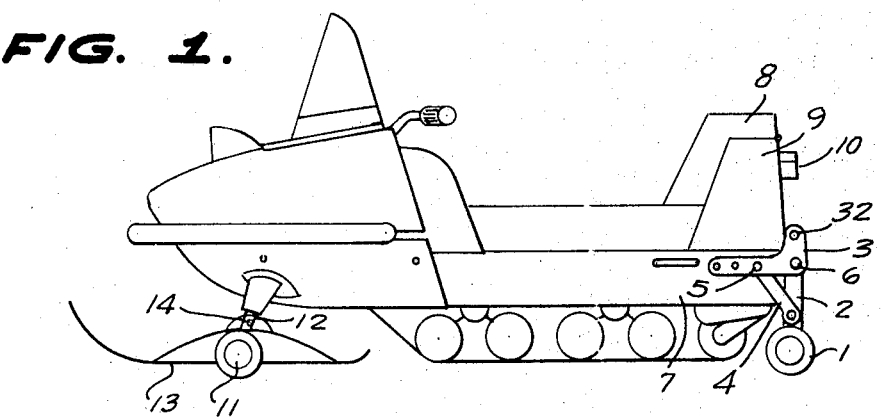

United States Patent

[11] 3,570,616

| [72] | Inventor | Yoshiaki Tominaga |
| | | Hamakita-shi, Japan |
| [21] | Appl. No. | 812,278 |
| [22] | Filed | Apr. 1, 1969 |
| [45] | Patented | Mar. 16, 1971 |
| [73] | Assignee | Yamaha Hatsudoki Kabushiki Kaisha |
| | | Hamakita-shi, Japan |
| [32] | Priority | Apr. 4, 1968 |
| [33] | | Japan |
| [31] | | 43/26,923 |

[54] REAR WHEEL DEVICE FOR SNOWMOBILES
16 Claims, 3 Drawing Figs.

| [52] | U.S. Cl. | 180/5, |
| | | 180/9.3 |
| [51] | Int. Cl. | B62d 55/02 |
| [50] | Field of Search | 180/5, 9.24, |
| | | 9.3; 280/8 |

[56] References Cited
UNITED STATES PATENTS

| 3,460,691 | 8/1969 | Wieger | 180/9.3x |
| 3,477,734 | 11/1969 | Albertson | 180/5x |
| 3,480,096 | 11/1969 | Hammitt | 180/9.24x |

OTHER REFERENCES
Popular Mechanics - Pages 138— 139 Oct 1967

*Primary Examiner*—Richard J. Johnson
*Attorney*—Berman, Davidson and Berman

ABSTRACT: A rear wheel device, for a snowmobile having a power-driven endless track, a steerable ski and an optionally attachable front wheel device, characterized by a pair of brackets secured to the rear of the sides of the snowmobile, a pair of wheel-carrying upright members pivotally mounted on said brackets, and a pair of brace bars, each pivotally secured to said upright members and removably attachable to different parts of said brackets. Said pair of wheels on the uprights, when in ground-engaging position, enabling the rear of the snowmobile and the endless track to be elevated above ground and, therefore, warmed up in advance of operation. The rear wheels, in combination with the front wheel device, enabling the snowmobile to be readily transported on snowless terrain. The uprights carrying the rear wheels may be positioned in horizontal or vertical orientations for towing persons or articles and protecting the rear of the snowmobile while running over snow-covered ground.

PATENTED MAR 16 1971 3,570,616

INVENTOR.
YOSHIAKA TOMINAGA,
BY
Berman, Davidson & Berman
ATTORNEYS.

REAR WHEEL DEVICE FOR SNOWMOBILES

This invention relates generally to snowmobiles, and more particularly to a snowmobile of the type having a power-driven endless track and steering skis improved by the addition of a wheel device mounted on the rear portion thereof.

Conventionally, a snowmobile is designed to be operated and steered over snow-covered terrain by means of steering skis suspended under the front of the body and a power-driven endless track in snow-engaging position under the rear. When, however, snowless ground is encountered, the conventional snowmobile cannot be easily transported or operated on such ground without damage to the power-driven endless track. The heavy weight of the snowmobile increases the difficulty of transporting or moving it from place-to-place. This problem is also present when the snowmobile is to be stored after use, or moved from storage to the point of use, as from a garage, or similar storage place.

Furthermore, usually a snowmobile is provided with an automatic torque converter—the high friction or running resistance making use of a speed-change gear impractical—and it is thus necessary to warm up the engine with the endless track elevated from ground-engaging position to prevent damage thereto. If the track is not elevated, the snowmobile would move across the ground.

Another problem which occurs with snowmobiles involved in collisions from behind is the danger of setting fire to fuel escaping from a damaged fuel tank which is generally mounted on the back of the snowmobile. The lack of suitable protecting devices also results in damage to other rear-mounted parts such as tail lamps, etc.

It is, therefore, a primary object of this invention to obviate the above-mentioned difficulties by providing a wheel device for mounting on the rear end of a snowmobile.

Another object of this invention is to provide an improved snowmobile with ground-engaging front and rear wheels, thereby permitting said snowmobile to be readily operated or transported on snowless terrain without damage to the endless track.

Still another object of this invention is to provide an improved snowmobile with detachable front wheel devices and a movable rear wheel device which permits alternate elevating positioning of the rear wheels, enabling the use of the snowmobile on snow-covered ground as a towing vehicle.

Yet another object of the invention is to provide a rear wheel device which, when placed in ground-engaging position, elevates the endless track from the ground and thereby permits rapid and efficient warmup of the snowmobile engine.

A still further object of this invention is to provide a rear wheel device with wheels having shock-absorbing properties such that when said device is in a nonground-engaging position said wheels protect the rear end of the snowmobile and the device further provides efficient means for towing skiers, sleighs, or articles over snow-covered terrain.

Figure 2:
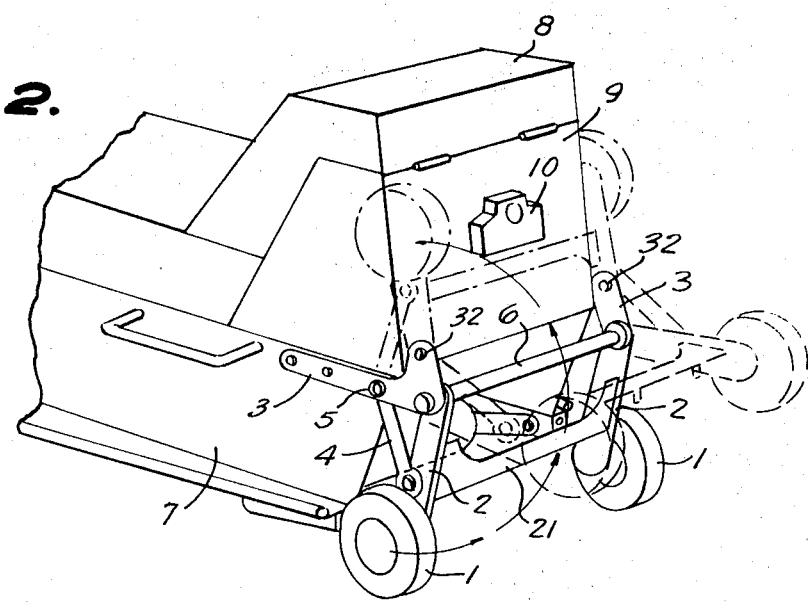
Figure 3:
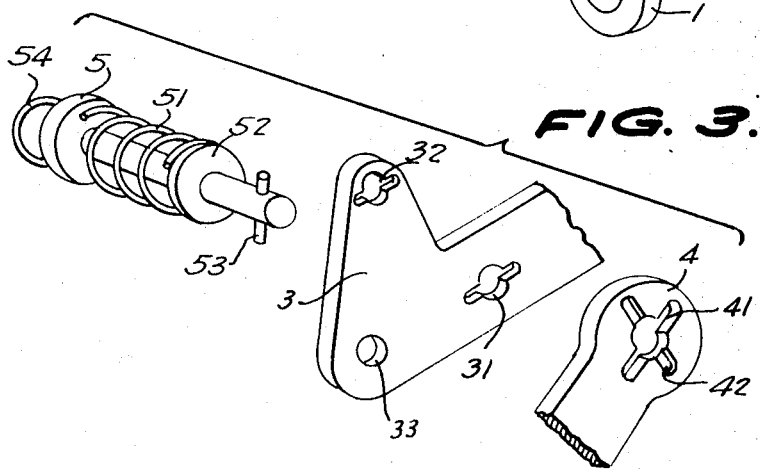

The novel features that are considered characteristic of this invention are set forth particularly in the appended claims. The invention, itself, however, both as to its organization and its operation, together with additional objects and advantages thereof, will best be understood from the following description of a specific embodiment when read in connection with the accompanying drawing, wherein like reference characters indicate like parts throughout the several views, and in which:

FIG. 1 is a side view of an improved snowmobile in accordance with this invention;

FIG. 2 is a fragmentary rear end perspective view showing an embodiment of the rear wheel device as attached in ground-engaging position to the rear portion of said snowmobile; alternate elevated positions shown in broken lines; and FIG. 3 is an exploded perspective view of connecting portions of the bracket; brace bar, and set bolt members of the wheel device of the present invention, as shown in FIG. 2.

The rear wheel device, in accordance with this invention, as shown in FIGS. 1 and 2, includes a pair of brackets 3 each secured on one side of the rear frame portion 7 of a snowmobile, and a pair of upright members 2 each pivotally mounted on opposite ends of axle 6 and extending transversely between said brackets 3. A pair of rear wheels 1 are journaled at the bottoms of uprights 2 in a conventional manner. The wheels may be of pneumatic or solid construction of elastomeric materials, such as natural or synthetic rubber. Other conventional materials having shock-absorbing properties may be used. A pair of brace, or torque bars 4 are each pivoted at one end to the lower portions of one of the uprights 2 and removably secured at the other end to a rear portion of one of said brackets 3 by a set bolt 5.

Of necessity, when a rear wheel device of the present invention is used, a removable front wheel device is installed under the front portion of the snowmobile body. The front wheel device includes a pair of vertically disposed struts 14 each mounted on one of the pair of steering columns 12 provided to suspend the steering skis 13. A front wheel 11 is journaled at the bottom of each of said struts 14. Also provided are a pair of ski-supporting, or lifting brackets, not shown. As thus briefly described, the front wheel devices may be more fully understood by reference to U.S. Pat. application Ser. No. 786,604, filed Dec. 24, 1968, or Canadian application Ser. No. 039,003, filed Dec. 30, 1968, both of which more completely describe and illustrate these front wheel devices. Any other suitable front wheel device may be utilized with the improved snowmobile rear wheel device of the present invention.

As best shown in FIGS. 2 and 3, the brackets 3 are substantially L-shaped and disposed horizontally rather than vertically. Each bracket comprises an elongated portion with suitable securing means for attachment to the rear frame of the snowmobile. Along the rearward portions of the bracket member are provided elongated apertures 31,32 adapted to receive a securing set bolt 5 with a protruding pin member, to be described in greater detail hereinafter. A hole 33 is provided at the free end of the horizontal leg of bracket 3 for support of axle 6; unmarked holes are provided at the opposite end for fixing the brackets to the sides of the rear portion of the frame 7 of the snowmobile by use of bolts, rivets, or other conventional fastening means. Each upright 2 includes a rear wheel 1 journaled at the bottom portion. A transverse, reinforcing member 21 connects opposing upright members along their midportions. The rod, or axle 6, passes through openings in the upper end portions of the uprights 2 and is journaled in openings 33 of brackets 3 so as to rotate and carry the uprights and wheels to positions other than the ground-engaging wheel position, shown in full lines in FIG. 2; alternate elevated positions are shown in broken lines. The uprights 2 may be fixed or rotatable with respect to the axles 6, as desired.

A pair of brace, or torque bars 4 are provided with elongated apertures 41 having radially projecting elongated grooves 42 disposed in a cross-shape at the inner surface of one end of each bar. Each brace bar is pivotally positioned at one end to the outer side of an end portion of the upright 2. The opposite end of the brace bar 4 is removably positioned against the inner surface of bracket 3 such that, the brace bar aperture 41 is in coaxial alignment with the bracket aperture 31. The brace bar bracket is secured by a pressure-activated, or spring-loaded set bolt 5, which includes a coil spring 51 disposed around a shank or shaft member between the head and a loose washer 52. A pin 53 is secured in a transverse hole in the free end of the shaft so as to protrude diametrically therefrom. The pin 53 is adapted to be inserted through the elongated apertures 31,41 of the bracket and brace bars, respectively, against the recoiling force of the coil spring 51. The knob 54 of said bolt 5 is turned 90° to settle pin 53 into the pin grooves 42 of the brace bar 4. Thus, the uprights 2 are fixed at a downward angle, as shown in solid lines in FIG. 2, to hold the rear of the body of the snowmobile in an uplifted position such that the endless track is elevated from ground engagement.

The rear wheel device may be easily adjusted with the uprights in approximately horizontal position, or orientation, and rear wheels extending rearwardly beyond the rear frame of the snowmobile. The uprights are first detached by pushing the knobs 54 against the force of springs 51 to disengage pins 53 from grooves 42. Set bolt 5 may then be turned 90° and pulled out of apertures 41 and 31, thereby releasing the brace bars 4 from the brackets 3. The uprights 2 are then lifted up to substantial horizontal positions, carrying the pivoted ends of the brace bars, whereupon the set bolt 5 is reinserted through the apertures 32,41 and turned approximately 90° to secure pin 53 in the grooves 42. By this procedure the horizontally disposed upright members 2 are firmly fastened to the brackets 3.

The rear wheels 1 may be moved and held in an upward, or vertical, orientation behind the backside of the snowmobile by the same basic procedure described above. As before, the set bolt 5 is removed from apertures 41 and apertures 31 or 32, depending on its previous position, thereby releasing brace bars 4. The uprights 2, carrying the pivoted ends of the brace bars, are then lifted in an upwardly direction and again fastened to said brackets and free ends of the brace bars by reinserting set bolts 5 through apertures 31,41.

From the above description it should be readily apparent that the rear wheels 1 are readily movable from a ground-engaging position to either of two elevated positions, or vice versa.

The front wheel devices can be installed under the forward portion of the snowmobile by mounting the struts 14 at the upper ends of the outer sides of the steering columns 12, using any suitable attaching means as, for example, nuts and bolts, the struts 14 having the front wheels journaled at the lower ends thereof. Thus, with the front and rear wheel devices in ground-engaging positions, the snowmobile is easily transported by rolling over snowless roads, and other terrain, even with the steering skis 13 installed. Other features provided in the snowmobile include a back seat 8, a fuel tank 9, and a tail lamp 10. Conventional power and drive means, not shown, are also provided.

With the front and rear wheel devices in ground-engaging positions, the snowmobile may be stored indoors or outdoors, as in the case of an automobile, and readily moved since the endless track of the snowmobile is elevated from the ground, thereby permitting the snowmobile to be transported without damage to said track. Furthermore, with the track thus elevated, the snowmobile engine can be warmed up with ease and safety prior to its use on snow.

When the snowmobile is being used on snow-covered terrain, the uprights 2 are fixed, as in the manner described earlier, so as to keep the rear wheels elevated from the ground and extending beyond the rear body portion of the snowmobile. In this position, sleighs, ski-players, etc. can be pulled, or towed, by hooking onto the reinforcing member 21. Additionally, various articles, or goods, may be carried on the uprights 2 and protected from damage by the shock-absorbing, rearwardly extending wheels.

With the rear wheels in a substantially upright position, the fuel tank, tail lamp, and other rear body portions in general, may be protected from damage.

It is, therefore, readily apparent that the rear wheel device of this invention enables the user to transport a snowmobile over snowless roads, permits the efficient and rapid warmup of the engine without damage to the endless belt, and further enables the towing of vehicles, or persons. The rubberlike wheels also serve to protect the rear portions of the snowmobile from damage, as in the case of an automobile bumper.

While a certain specific embodiment of this invention has been illustrated and described, it is obvious that many modifications thereof are possible. This invention, therefore, is not intended to be restricted to the exact showing of the drawings and the description thereof, but is considered to include reasonable and obvious equivalents.

I claim:

1. In a snowmobile with a steerable ski and a power-driven endless track, the improvement comprising a wheel device mounted on the rear portion of the snowmobile, said wheel device comprising, a bracket, an upright member pivotally mounted on said bracket, a wheel journaled to said upright, a brace bar having one end pivotally connected to said upright, and means for removably securing the other end of said brace bar to said bracket, whereby said rear wheel may be moved from a ground-engaging position to an elevated position.

2. The combination as set forth in claim 1, wherein said wheel includes an elastomeric material taken from the group consisting of natural rubber, synthetic rubber or rubberlike materials.

3. The combination set forth in claim 1, wherein said wheel device includes a pair of brackets, a pair of upright members, a pair of wheels and a pair of brace bars, one bracket, upright member, wheel and brace bar being mounted on each side of the rear frame portion of said snowmobile.

4. The combination as set forth in claim 3, wherein said upright members are connected by a transverse reinforcing member.

5. The combination as set forth in claim 1, wherein said means for removably securing said brace bar to said bracket comprise a pressure-activated set bolt.

6. The combination as set forth in claim 5, wherein said means for removably securing the bracket and brace bar include elongated apertures therein adapted for coaxial alignment with each other for receiving said spring-loaded set bolt.

7. The combination as set forth in claim 6, wherein said set bolt includes a shank having a transversely protruding pin positioned near one end, and wherein said brace bar elongated aperture includes a radially projecting groove displaced from the elongated portion of the aperture for securing said pin.

8. The combination as set forth in claim 7, wherein said bracket includes a plurality of elongated apertures for alternate positioning of said brace bar.

9. The combination as set forth in claim 1, wherein said bracket includes a forward portion with means for attachment to said frame and a rearward portion with aperture means for securing said upright member and brace bar.

10. The combination as set forth in claim 9, wherein said bracket is L-shaped and mounted so that the forward portion is elongated and in a substantially horizontal position, with the rear portion being vertical and extending beyond the rear frame of said snowmobile.

11. A wheel device for use with a snowmobile of the type equipped with a front steering ski and a rear power-driven endless belt, comprising a bracket for mounting on the rear frame portion of said snowmobile, an upright member having its upper end pivotally mounted on said bracket, a brace bar having one end pivotally connected to said upright, a wheel rotatably mounted on the lower end of said upright, and means for removably securing the other end of said brace bar to said bracket, whereby said wheel may be moved from a ground-engaging position to an alternate position elevated therefrom.

12. A wheel device as set forth in claim 11, wherein said bracket and brace bar each includes elongated apertures adapted for coaxial alignment and for receiving said means for removably securing said brace bar to said bracket.

13. A wheel device as set forth in claim 12, wherein said securing means comprises a pressure-activated set bolt.

14. A wheel device as set forth in claim 11, wherein a pair of brackets, a pair of upright members, a pair of wheels and a pair of brace bars are provided, one bracket, upright member, wheel and brace bar being adapted for positioning on each of the opposite sides of the rear portion of said snowmobile.

15. A wheel device as set forth in claim 14, wherein said upright members are connected by a transversely extending rod and a reinforcing member thereby providing additional strength and rigidity to said device.

16. A snowmobile having a power-driven endless track, a steering column and a steerable ski, in combination with a detachable front and an adjustable rear ground-engaging wheel device which permit the snowmobile to be operated or transported on snowless terrain, said front wheel device comprising a strut removably mounted on said steering column, a front wheel journaled at a lower portion of said strut, and means to elevate said ski from the ground when the front wheel is in ground-engaging position, said rear wheel device comprising a bracket secured along the rear portion of said snowmobile, a rear wheel-carrying upright member pivotally mounted on said bracket, and a brace bar with one end pivotally connected to said upright and the other end removably and adjustably secured to said bracket, whereby said rear wheel may be moved from ground-engaging position to alternate positions elevated therefrom.